United States Patent
Kobayashi

Patent Number: 5,231,371
Date of Patent: Jul. 27, 1993

[54] OVERCURRENT PROTECTION CIRCUIT
[75] Inventor: Nobuo Kobayashi, Tokyo, Japan
[73] Assignee: TDK Corporation, Tokyo, Japan
[21] Appl. No.: 582,188
[22] PCT Filed: Feb. 27, 1990
[86] PCT No.: PCT/JP90/00241
  § 371 Date: Sep. 26, 1990
  § 102(e) Date: Sep. 26, 1990
[87] PCT Pub. No.: WO91/13483
  PCT Pub. Date: Sep. 5, 1991
[51] Int. Cl.[5] ............................................ H01C 7/10
[52] U.S. Cl. .................................. 338/22 R; 338/21
[58] Field of Search ............... 338/22 R, 225 D, 20, 338/21; 361/106, 27, 165

[56] References Cited
U.S. PATENT DOCUMENTS
4,481,498 11/1984 McTavish et al. .................. 338/20

FOREIGN PATENT DOCUMENTS
58-190230 11/1983 Japan .

*Primary Examiner*—Marvin M. Lateef
*Attorney, Agent, or Firm*—Nikaido, Marmelstein, Murray & Oram

[57] ABSTRACT

A feature of the present invention is that an overcurrent protection circuit is constituted so as to have the voltage relationship of $V_2/V_1 < V_3/V_2$, wherein $V_1$ is a voltage applied to a positive temperature coefficient resistor at a steady current, $V_2$ is a voltage applied to said positive temperature coefficient resistor at the maximum current, and $V_3$ is a voltage applied to said positive temperature coefficient at the equilibrium current. The equilibrium current is rendered less than the steady current, so that heat generation of the load is effectively suppressed and the advantage of enhanced safety of the circuit is achieved.

3 Claims, 3 Drawing Sheets

OVERCURRENT PROTECTION CIRCUIT

FIELD OF THE INVENTION

The present invention relates to a circuit protection device including a positive temperature coefficient resistor (hereinafter called a polymer PTC element) wherein carbon black is dispersed in crystalline resin.

BACKGROUND OF THE INVENTION

In a series circuit composed of a load, a power source, and a polymer PTC element, when an overcurrent flows such as by short-circuiting the temperature of the polymer PTC element rises due to Joule heat generation and in dependence upon the temperature rise the resistance of the element increases. As a result, the overcurrent is limited and the circuit is protected.

The polymer PTC element, as disclosed in Japanese Patent Application Laid-Open publication No. 216401/1986, is a resistor wherein the carbon black is dispersed in crystalline resin and shows a positive temperature coefficient. Further, it has been known that such a polymer PTC element has an overcurrent protecting function.

FIG. 2 is a circuit diagram illustrating a circuit protection device including a polymer PTC element. In the circuit of the same drawing, when an overcurrent flows due to short-circuiting, and assuming that the resistance of the load is R and the current flowing in the load is I, the amount of heat generation $I^2R$ in the polymer PTC element exceeds the amount of heat radiation, and the temperature of the element rises. Since the polymer PTC element has a resistance-temperature characteristic as shown in FIG. 3, the resistance thereof increases in dependence upon the temperature rise, the current is limited and the circuit in the form of a road is protected.

FIG. 4 is a diagram illustrating a current-voltage characteristic of the polymer PTC element. In a region where an applied voltage to the polymer PTC element is low, the temperature of the element is low and Ohm's low is maintained. In the circuit of FIG. 2, when there is no abnormality in the circuit, the polymer PTC element is held in any optional regions. Such regions correspond to steady state, and the current at this moment is called a steady current. When the applied voltage to the polymer PTC element further increases, the resistance of the polymer PTC element will suddenly increase while the temperature thereof is kept substantially constant. After the current exceeds the largest working current which can flow in the non-operable range of the polymer PTC element and reaches to a largest value, the current attenuates in response to the voltage rise. This largest current is called a maximum current. When an overcurrent flows through the circuit, the amount of heat generation of the polymer PTC element exceeds the amount of heat radiation, and the temperature of the polymer PTC rises. The amount of heat radiation is proportional to the difference between the element temperature and the ambient temperature. Since the resistance suddenly increases and the current decreases, finally, the amount of heat generation and that of heat radiation become equal (equilibrium condition). The current at this moment is called an equilibrium current. The relationship between the amount of heat generation and that of heat radiation is expressed by the following equation wherein C is the heat radiation coefficient, T is the element temperature and $T_a$ is ambient temperature:

$$I^2R = C(T - T_a)$$

In the region where the resistance of the polymer PTC element rises, the temperature of the element is maintained substantially constant and the current I decreases until the amount of heat generation coincides with that of heat radiation.

For such use, a PTC using a barium titanate system is employed widely. The resistance of the PTC of barium titanate is high so that the size of the element becomes large to increase the heat radiation coefficient. For example, with a polymer PTC element employed for the overcurrent protection use for a small size motor, it displays a current-voltage characteristic A as shown in FIG. 1. When a power source voltage of 10 V is used, the equilibrium current becomes 0.5 A which is larger than the steady current. For this reason the motor overheats and damage thereof is possibly caused.

Further, U.S. Pat. Nos. 4,329,726 and 4,238,812 disclose, respectively, circuits for reducing the equilibrium current. According to the disclosure of these patents, when the ratio $P_2/P_1$ between an output $P_1$ of the polymer PTC element in the steady state and an output $P_2$ during the PTC operation is more than 8 (or 10), it is indicated that the current is sufficiently limited. However, as shown by A in FIG. 1, even though the output of the polymer PTC element at the steady current is 0.01 W, and the output ratio in the equilibrium state reaches up to 400, the equilibrium current can not be limited below the steady current. Further, when the voltage applied to the polymer PTC element becomes 3 V, the equilibrium current becomes more than 1 A which exceeds the largest working current, and the possibility of fire occurs. Therefore, even if the ratio is more than 8 (or 10), it is impossible to reduce the equilibrium current sufficiently.

DISCLOSURE OF THE INVENTION

A technical problem to be solved by the present invention is to decrease the equilibrium current, at least below the largest working current, preferably less than the steady current, and further preferably less than one third of the steady current.

The reason why the equilibrium current can not be limited sufficiently in A of FIG. 1 is that the voltage $V_3$ at the equilibrium current comes near to $V_2$ at the maximum current. Therefore, according to the present invention, for reducing the equilibrium current to less than the largest working current, the circuit is constituted so as to have the voltage relationship $V_2/V_1 < V_3/V_2$ to solve the problem.

For example, by using a power source of 10 V, and a PTC element of $0.1\Omega$ and 10 as an embodiment and constituting the circuit so as to have the voltage relationship $V_2/V_1 < V_3/V_2$, the equilibrium current can be reduced to less than the steady current.

Further, with a circuit constituted so that a ratio between a voltage $V_4$ at the largest working current and a voltage $V_2$ at the maximum current is to be $V_2/V_4 < V_3/V_2$, the equibrium current can be limited at least less than the largest working current. Therefore, by reducing the equilibrium current less than the steady current, the heat generation of the load is suppressed and the safety of the circuit is enhanced.

For satisfying the above constitution where, the voltage relationship $V_2/V_1 < V_3/V_2$, it is necessary to decrease the resistance as well as the heat radiation coefficient of the element.

The resistivity of the PTC of barium titanate which has been conventionally used is as high as $5\Omega\cdot cm$, and, further the withstand voltage per unit thickness is low. In order to decrease the resistance of the element, the size of the element has to be enlarged, and in accordance therewith the heat radiation coefficient increases such that an increase of the equilibrium current is induced.

Therefore, in order to decrease the equilibrium current, it is necessary to use PTCs having a small resistivity such as polymer PTC elements. In particular, for uses where the maximum current reaches more than several amps, the polymer PTC element is indispensable.

BEST MODE FOR CARRYING OUT THE INVENTION

Hereinbelow, an embodiment of the present invention is explained with reference to the drawings.

Figure 1:
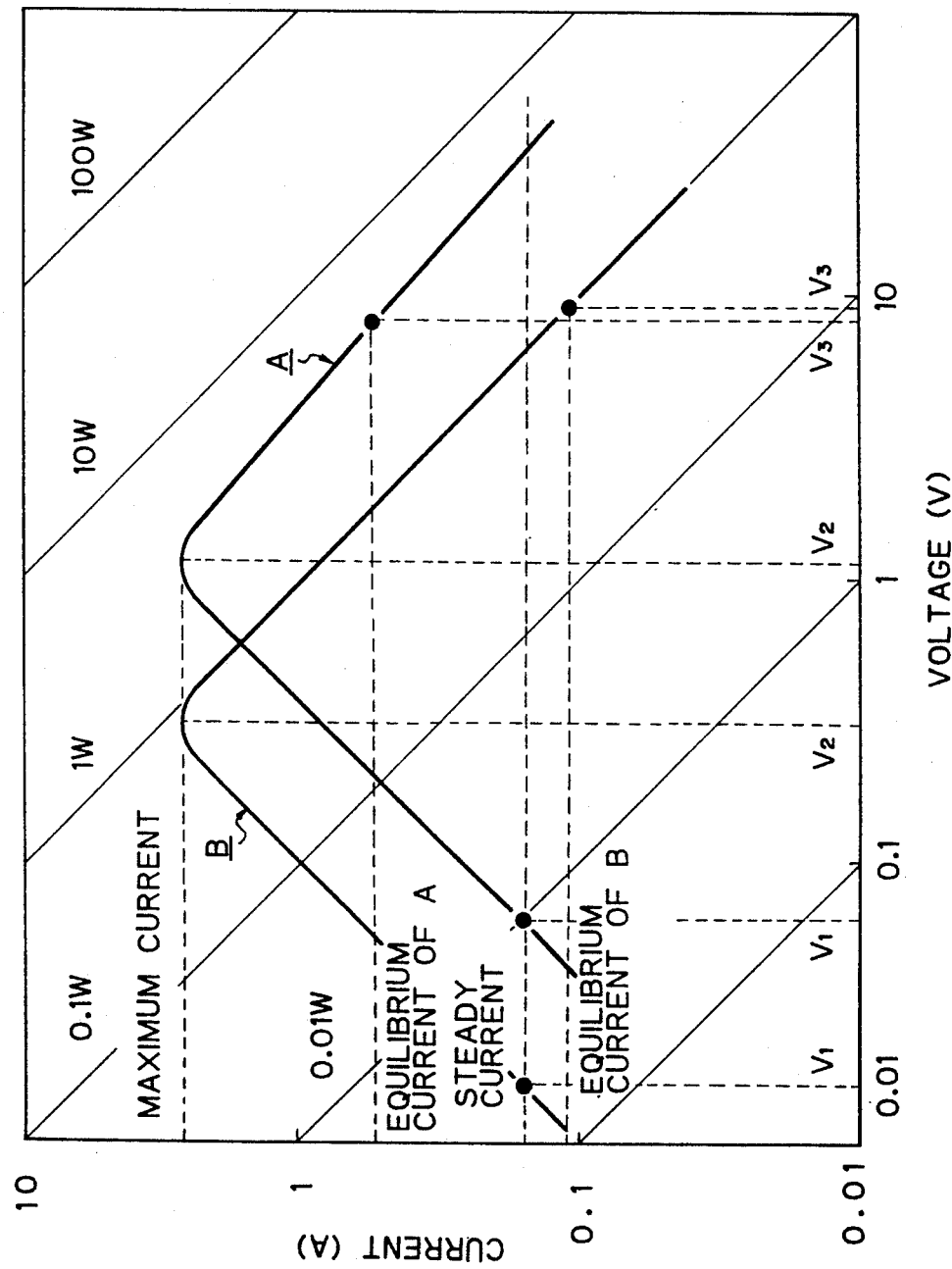
FIG. 1 is a view illustrating a voltage-current characteristic of a polymer PTC element according to the present invention.
Figure 2:
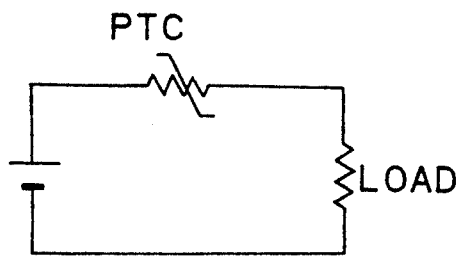
FIG. 2 is a circuit diagram illustrating a circuit protection device including the polymer PTC element.
Figure 3:
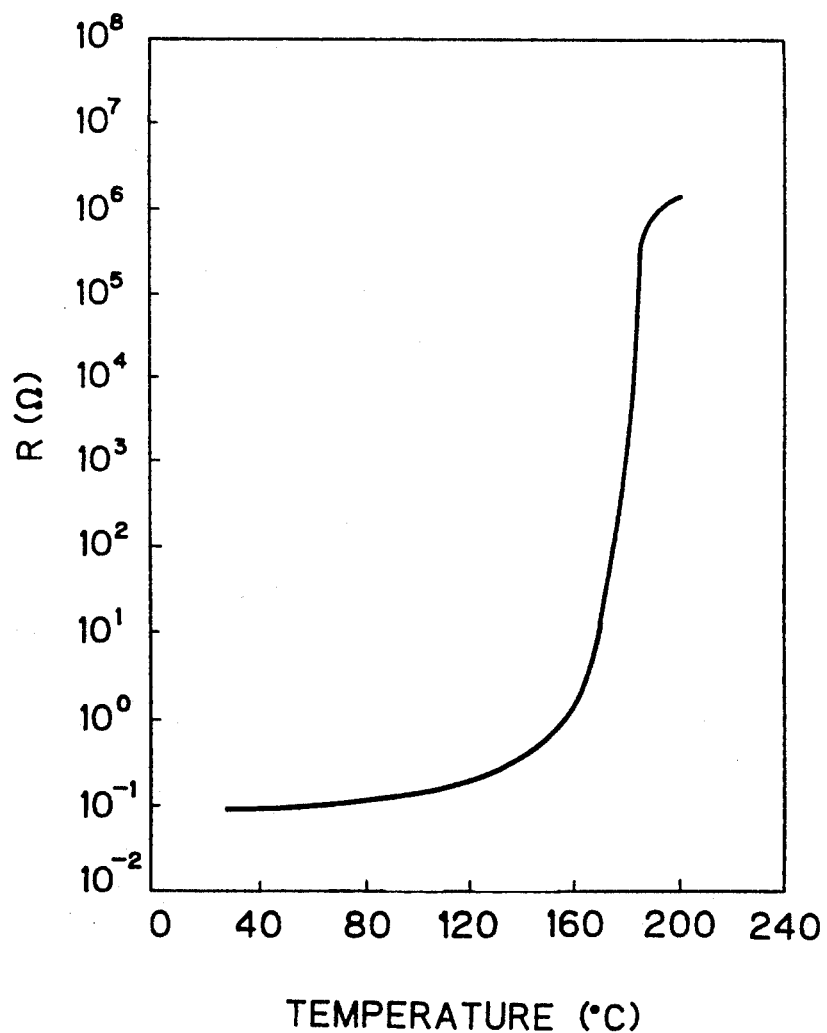
FIG. 3 is a view illustrating a resistance-temperature characteristic of the polymer PTC element.
Figure 4:
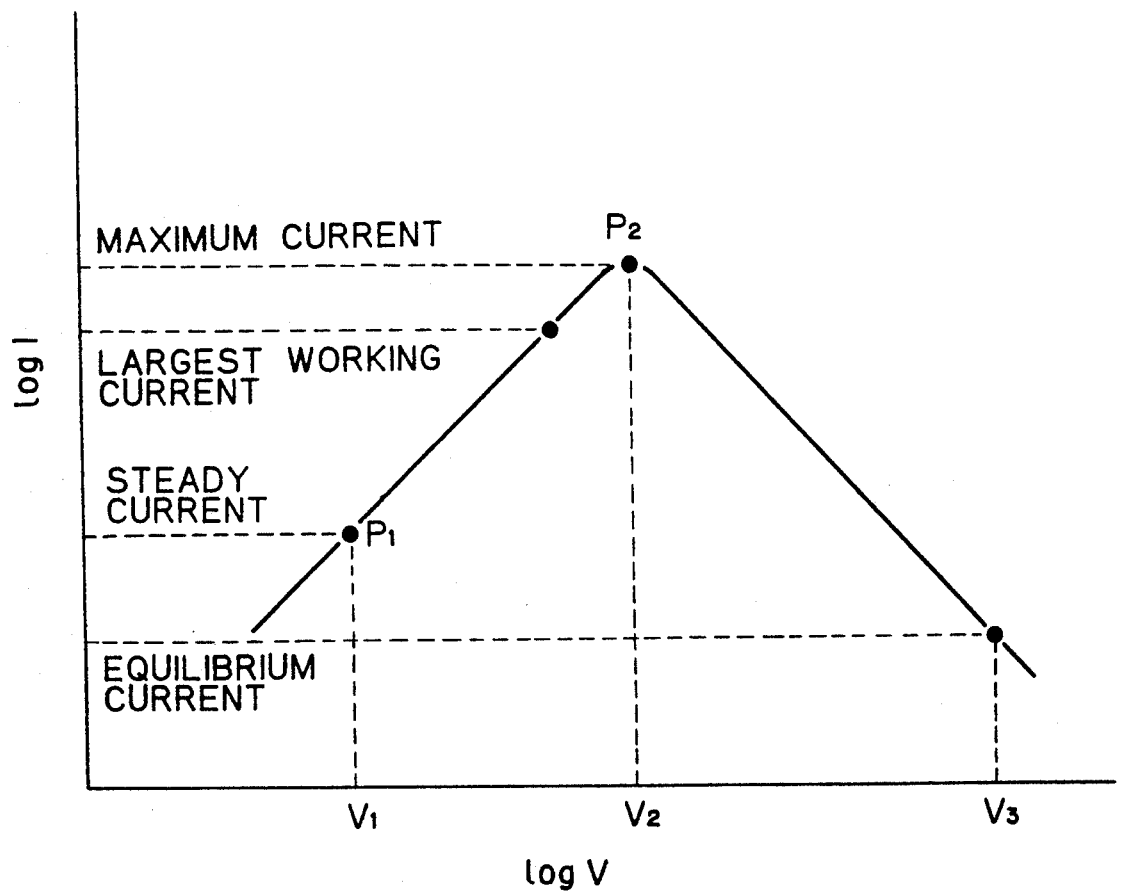
FIG. 4 is a view illustrating a current-voltage characteristic of the polymer PTC element.

In the circuit according to the embodiment which is composed of, as in FIG. 2, a power source of 10 V, a load in the form of a small sized motor of $2\Omega$, and a polymer PTC element which has carbon black dispersed in polyvinylidene fluoride, a diameter of 10 mm, the resistance-temperature characteristic in FIG. 3, and the current-voltage characteristic of B in FIG. 1, by constituting the circuit so as to have the voltage relationship of $V_2/V_1 < V_3/V_2$, the equilibrium current is possibly reduced less than the steady current. Namely, in the present embodiment, the voltage relationship of $V_2/V_1 < V_3/V_2$ is achieved as explained above, the equilibrium current is reduced down to 0.1 A with respect to the steady state current of 0.16 A so that the overheating of the small sized motor is possibly suppressed. In contrast in the circuit which is composed of the same power source of 10 V, the load in the form of the small sized motor of $2\Omega$ and a barium titanate PTC having the same largest working current as that of the above polymer PTC element, the equilibrium current, becomes 0.5 A with respect to the steady current of 0.16 A the amount of heat generation of the small sized motor in an abnormal condition reaches of 25 times of that using the polymer PTC element.

What is claimed is:

1. An overcurrent protection circuit which is composed of a power source, a load and an overcurrent protection element, characterized in that said overcurrent protection element is a positive temperature coefficient resistor in which carbon black is dispersed in crystalline resin, wherein a voltage applied to said positive temperature coefficient resistor at a steady current is $V_1$, a voltage applied to said positive temperature coefficient resistor at the maximum current is $V_2$, and a voltage applied to said positive temperature coefficient resistor at the equilibrium current is $V_3$ whereby a voltage relationship of $V_2/V_1 < V_3/V_2$ is maintained.

2. An overcurrent protection circuit, comprising:
   a power source;
   a load; and
   an overcurrent protection element that includes a positive temperature coefficient resistor in which carbon black is dispersed in crystalline resin such that a voltage applied to the positive temperature coefficient resistor at a steady current $V_1$, a voltage applied to the positive temperature coefficient resistor at the maximum current $V_2$ and a voltage applied to the positive temperature coefficient resistor at the equilibrium current $V_3$ maintain a voltage relationship of $V_2/V_1 < V_3/V_2$.

3. In an overcurrent protection circuit which is composed of a power source, a load and an overcurrent protection element, the overcurrent protection element comprising:
   a positive temperature coefficient resistor in which carbon black is dispersed in crystalline resin such that a voltage applied to said positive temperature coefficient resistor at a steady current $V_1$, a voltage applied to said positive temperature coefficient resistor at the maximum current $V_2$ and a voltage applied to said positive temperature coefficient resistor at the equilibrium current $V_3$ maintain a voltage relationship of $V_2/V_1 < V_3/V_2$.

* * * * *